United States Patent [19]

Tsuchiya

[11] Patent Number: 5,760,416
[45] Date of Patent: Jun. 2, 1998

[54] RADIOGRAPHIC IMAGE INFORMATION READING APPARATUS

[75] Inventor: Motoharu Tsuchiya, deceased, late of Ueda, Japan, by Sachio Tsuchiya, legal representative

[73] Assignee: Konica Corporation, Tokyo, Japan

[21] Appl. No.: 725,618

[22] Filed: Oct. 3, 1996

[30] Foreign Application Priority Data

Oct. 11, 1995 [JP] Japan .................. 7-263129

[51] Int. Cl.$^6$ ...................... G03B 42/02
[52] U.S. Cl. ...................... 250/584
[58] Field of Search ...................... 250/584, 585, 250/586, 587

[56] References Cited

U.S. PATENT DOCUMENTS 3,859,527  1/1975  Luckey .
4,551,626  11/1985  Agano ...................... 250/586
4,642,462  2/1987  Aagano et al. ...................... 250/586

FOREIGN PATENT DOCUMENTS 55-12144  1/1980  Japan .
3-132156  6/1991  Japan .
4-119189  4/1992  Japan .

Primary Examiner—Edward J. Glick
Attorney, Agent, or Firm—Frishauf, Holtz, Goodman, Langer & Chick

[57] ABSTRACT

An apparatus for reading a radiographic image on a stimulable phosphor sheet, includes a scanner having a rotatable polygon mirror having N pieces of mirror surfaces so that the scanner scans N lines during one rotation of the polygon mirror, and a correcting circuit for correcting image signals so as to eliminate irregularity caused by the polygon mirror. The correcting circuit includes a memory for storing a correction value for each of the mirror surfaces, a surface detecting circuit to identify a mirror surface used for scanning a current line of the image signals, and a shifting circuit to shift data in the memory to the correction value of the identified mirror surface.

12 Claims, 10 Drawing Sheets

RADIOGRAPHIC IMAGE INFORMATION READING APPARATUS

BACKGROUND OF THE INVENTION

1. Field of the Invention

The present invention relates to a radiographic image reading apparatus which reads radiographic image information in an optical manner, and in particular, to correction of images to be read.

2. Prior Art

In recent years, there have been devised methods for obtaining radiographic image information without using an X-ray film. These methods include one wherein radioactive rays transmitted through an object are absorbed in a phosphor of a certain type. Then, the phosphor is excited by light energy or heat energy, for example, and thereby, the phosphor is caused to emit radioactive energy accumulated in it through the aforesaid absorption as fluorescent light. The fluorescent light is then detected as an image. To be concrete, these technologies are disclosed in U.S. Pat. No. 3,859,527 and Japanese Patent Publication Open to Public Inspection No. 12144/1980 (this latter type of publication hereinafter referred to as a Japanese Patent O.P.I. Publication). In these technologies, a radiographic image conversion panel is used, and there is disclosed a radiographic image conversion method wherein visible light or infrared light is used as excitation light. Namely, there is used a radiographic image conversion panel in which an accelerating phosphor layer is formed on a support, and radioactive rays transmitted through an object are projected on the accelerating phosphor layer of the radiographic image conversion panel so that radioactive ray energy corresponding to a transmission degree of each portion of the object is accumulated to form a latent image, and after that, the accelerating phosphor layer is scanned with the aforesaid excitation light, and thereby the radioactive ray energy accumulated at each portion of the panel is caused to be radiated as an accelerated emission whose intensity is detected by a photoelectric transfer element such as a photomultiplier or a photodiode so that a radiographic image may be obtained.

Figure 9:
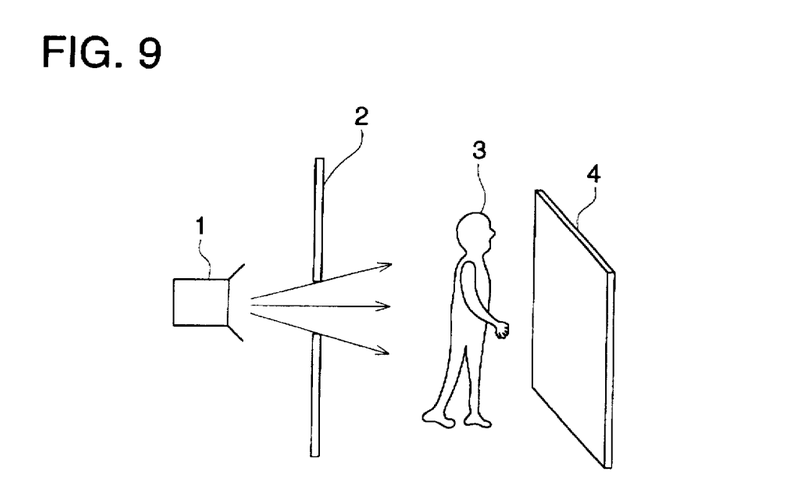
FIG. 9 is an illustration of how to record images on an accelerating phosphor.

FIG. 9 is an illustration of image recording on an accelerating phosphor such as that mentioned above. In the drawing, X-rays emitted from X-ray source 1 are projected on object 3 after being stopped down by aperture 2. X-rays transmitted through the object 3 enter accelerating phosphor 4 on which a latent image of object 3 image is formed.

Figure 10:
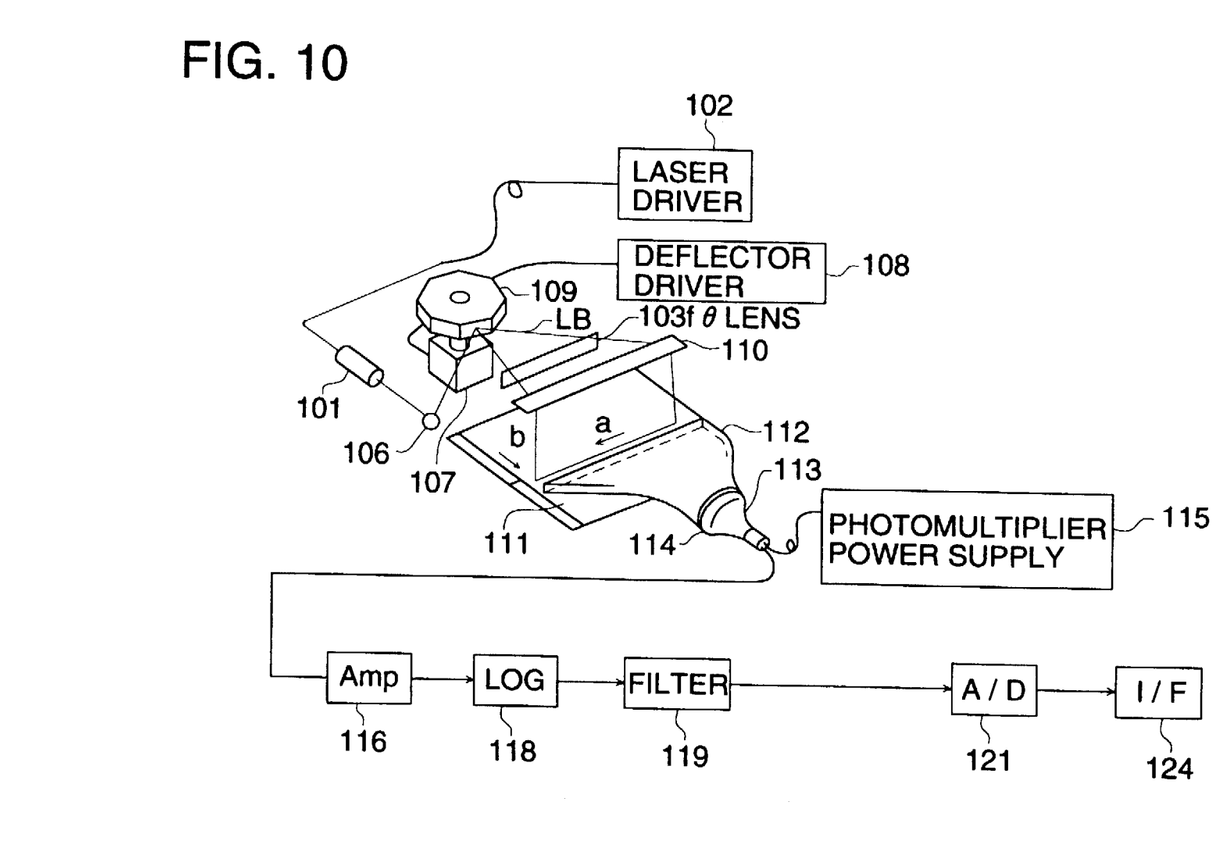
FIG. 10 is a block diagram showing a structure example of a conventional apparatus.

FIG. 10 is a block diagram showing a structural example of a conventional radiographic image information reading apparatus which reads radiographic images recorded on the accelerating phosphor as those mentioned above. The numeral 101 is a semiconductor laser light source for generating excitation light, and the semiconductor laser light source 101 is driven by laser driver circuit 102. Laser beam LB generated by the semiconductor laser light source 101 arrives at deflector 107 through mirror 106. The deflector 107 is equipped with polygon mirror 109 which is driven by deflector driver 108, and it deflects the laser beam LB within a scanning zone. The deflected laser beam LB passes through f θ lens so that it is adjusted to have a constant speed on scanning lines, and then is scanned in the direction of arrow a, through mirror 110, on radiographic image conversion panel 111 wherein an accelerating phosphor is used as a radiographic image information recording medium. The radiographic image conversion panel 111 simultaneously moves in the sub-scanning direction (direction of arrow b) while it is being scanned, so that its entire surface can be scanned. Accelerated emission generated from the radiographic image conversion panel 111 scanned by the laser beam LB is converged by condenser 112, and then, passes through filter 113 which transmits only wavelength zone of the accelerated emission and arrives at light detector 114 equipped with a photomultiplier where it is converted to an analog electric signal (image signal).

The numeral 115 is a power supply which supplies a high voltage to the light detector 114 (photomultiplier). An image signal outputted from the light detector 114 as an electric current passes through pre-amplifier 116 to be amplified, and then, after passing further through logarithmic amplifier 118 which converts an emission intensity signal to an image intensity signal and through filter 119, it is converted to a digital signal by A/D converter 121 and is sent to an outside processing equipment through interface 124.

The above described radiographic image information reading techniques have the following problems: sensitivity irregularity (irregularity in both the primary scanning and sub-scanning directions) of radiations and accelerating phosphors and irregularity of excitation light scanning system and converging system (irregularity in the primary scanning direction). These irregularities are required to be corrected.

Figure 11:
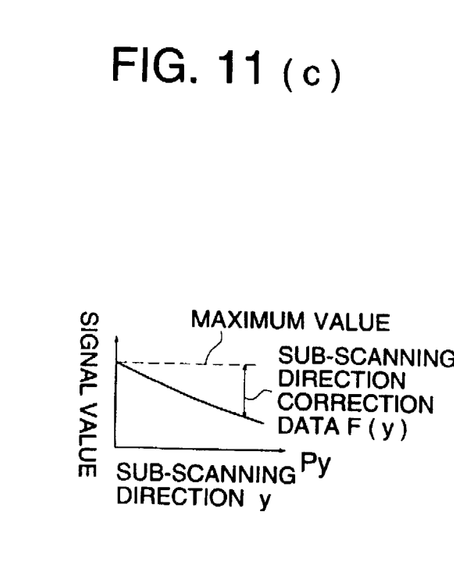
FIGS. 11(a) to 11(c) are illustrations of how to prepare correction data.

FIG. 11 is an illustration showing an example of how to prepare correction data. In drawing (a), S (x, y) is image information obtained by reading after irradiating an entire surface of a radiographic image conversion panel with X-rays having uniform intensity without placing an object, wherein 2048 pixels are arranged in the primary scanning direction x and 2048 scanning lines exist in the sub-scanning direction. Px represents a profile in the primary scanning direction x, while Py represents a profile in the sub-scanning direction y. A difference between the maximum value of each of profiles Px and Py and a signal value at each pixel in the primary scanning direction x (in the case of Px) and in the sub-scanning direction y (in the case of Py) is obtained. Due to this, a difference between the maximum value (MAX value) on profile Px and a signal value at each pixel in the primary scanning direction x results in correction data J (x) for the primary scanning direction x as shown in (b), and irregularity in the primary scanning direction can be corrected. Further, a difference between the maximum value (MAX value) on profile Py and a signal value at each pixel in the sub-scanning direction y results in correction data F (y) for the sub-scanning direction y as shown in (c), and irregularity in the sub-scanning direction can be corrected.

Problems to be Solved by the Invention

In the conventional apparatus mentioned above, sensitivity irregularity on each face of a polygon mirror is caused by a difference of reflectivity on each face of the polygon mirror and an inclination angle thereof because of the polygon mirror used in the beam scanning system. As a method for correcting such sensitivity irregularity of a polygon mirror, the following methods are known.

(1) Japanese Patent O.P.I. Publication No. 119189/1992

A method wherein the relation between a face of a polygon mirror and a scanning position is made to be constant at all times, and thereby, sensitivity irregularity caused by the polygon mirror can also be corrected simultaneously when aforesaid sensitivity irregularity is corrected.

(2) Japanese Patent O.P.I. Publication No. 132156/1991

A method wherein a scanning-reading means is adjusted in accordance with fluctuation in scanning speed caused by reflection faces of a polygon mirror and with other fluctuation, and an image signal is corrected by correlating the image signal with the reflection face.

However, due to the influence of transport accuracy of a transport means that moves a beam scanning system or radiographic image conversion panel, detection accuracy of a position sensor and controlling accuracy of a motor which rotates a polygon mirror, the relation between a polygon mirror face and a scanning position can not be constant, which is a problem. In addition, when reflectivity and an inclination angle of each face of a polygon mirror are changed through deterioration with age, if irregularity of the polygon mirror is corrected, streaks are increased, which is a problem. Further, when sampling pitch is different, irregularity caused by a polygon mirror is generated in a different way. When this change is not considered for correction, therefore, satisfactory correction can not made, which is also a problem.

When the sampling pitch is different, irregularity caused by a polygon mirror is generated in a different way. The reason for this is as follow. A laser beam for excitation is irradiated on the entire surface of a radiographic image conversion panel when it is shifted one pixel by one pixel in the sub-scanning direction while being subjected to scanning in the primary scanning direction by a polygon mirror. In this case, a latent image of a pixel which is irradiated by a laser beam for image reading is reduced at a certain rate by diffused laser beams which have arrived at the pixel until that moment. The signals to be read actually are read under the influence of this reduction. When sampling pitch is changed, an amount of the reduction of a latent image varies accordingly. When such phenomenon takes place, polygonal irregularity also is caused in a different way. Therefore, when this change is not considered for correction, satisfactory correction can not made.

SUMMARY OF THE INVENTION

The present invention has been achieved with a background of the problems mentioned above, and its object is to provide a radiographic image information reading apparatus capable of correcting accurately polygonal irregularity caused by a polygon mirror.
Means of Solving the Problems A first embodiment invention for solving the problems mentioned above is represented by a radiographic image reading apparatus irradiating excitation light deflected by a polygon mirror on an accelerating phosphor panel storing therein radiographic image information, then, reading photoelectrically accelerated emission light emitted from the accelerating phosphor panel and thereby obtaining a radiographic image, wherein there are provided a face information detecting means which detects face information on the polygon mirror, a sensitivity irregularity correction data calculating means which obtains sensitivity irregularity correction data for the most part of the entire surface of an image based on radiographic image data read in advance, a correction data/face information storing means which receives output of the sensitivity irregularity correction data calculating means and output of the face information detecting means obtained at the moment when the image from which the sensitivity irregularity correction data is obtained is read, and stores the sensitivity irregularity correction data and face information so that they may correspond to each other, a sensitivity irregularity correction data shifting means which shifts sensitivity irregularity correction data stored in the correction data/face information storing means in the primary scanning direction and/or the sub-scanning direction based upon output of the face information detecting means and face information stored in he correction data/face information storing means, and a sensitivity irregularity correcting means which corrects image data based on correction data from the sensitivity irregularity correction data shifting means.

Constitution of the invention wherein a face information detecting means which detects face information on a polygon mirror is provided, and correction data is corrected after being modified by a sensitivity irregularity correction data shifting means, makes it possible to correct accurately the polygonal irregularity caused by the polygon mirror.

In this case, the aforesaid face information detecting means is characterized in that image data read by the aforesaid image reading means are analyzed and thereby polygon mirror face information are detected.

Owing to the constitution of the invention, the aforesaid face information detecting means can detect polygon mirror face information by analyzing clinical image data read by the aforesaid image reading means, and can correct the clinical image data by using correction data corresponding to polygon mirror face, and thereby correct accurately polygonal irregularity caused by a polygon mirror.

The aforesaid face information detecting means is characterized in that polygon mirror face information can be detected by analyzing output of a one-dimensional light sensor or a two-dimensional light sensor.

In the constitution of the invention, the aforesaid face information detecting means can detect polygon face information by analyzing an output of a one-dimensional sensor or a two-dimensional sensor, and thereby it is possible to prepare clinical image data by using correction data corresponding to the polygon mirror face and to correct accurately polygonal irregularity caused by a polygon mirror.

A second embodiment of the present invention for solving the problems mentioned above is represented by a radiographic image reading apparatus irradiating excitation light deflected by a polygon mirror on an accelerating phosphor panel storing therein radiographic image information, then, reading photoelectrically accelerated emission light emitted from the accelerating phosphor panel and thereby obtaining a radiographic image, wherein there are provided a polygonal irregularity information extracting means which obtains information relating to sensitivity irregularity caused by the polygon mirror, a correction data storing means which prepares and stores the correction data for correcting, based on image data read in advance, sensitivity irregularity caused by polygon, a polygonal irregularity information storing means which stores, as a standard polygonal irregularity information, the polygonal irregularity information obtained by the polygonal irregularity information extracting means in reading in advance, a decision means which compares polygonal irregularity information from the aforesaid polygonal irregularity information extracting means with the standard polygonal irregularity information stored in the aforesaid polygonal irregularity information storing means and thereby decides whether or not to correct the polygonal irregularity, and a polygonal irregularity correcting means which corrects the read radiographic image data by using correction data stored in the correction data storing means when decided to correct based on the decision results of the decision means.

In the constitution of the invention, when the image reading means reads an image, the decision means decides, based on polygonal irregularity information obtained by the aforesaid polygonal irregularity information extracting means and the standard polygonal irregularity information stored in the aforesaid polygonal irregularity information storing means, whether or not to correct the polygonal irregularity, and the aforesaid polygonal irregularity correction means corrects only for the occasion of polygonal irregularity which is the same as those in preparation of correction data, resulting in that the polygonal irregularity caused by a polygon mirror can be corrected accurately.

In this case, the polygonal irregularity information extracting means is characterized in that polygonal irregularity information can be extracted by analyzing the image data read by the image reading means.

In the constitution of the invention, the polygonal irregularity information extracting means extracts polygonal irregularity information by analyzing image data. Therefore, no special mechanism for extracting polygonal irregularity information is needed.

Further, the polygonal irregularity information extracting means is characterized in that polygonal irregularity information is extracted by analyzing an output of a one-dimensional light sensor or of a two-dimensional light sensor.

The constitution of the invention makes it possible to extract polygonal irregularity information through a simple structure.

A third embodiment of the present invention for solving the problems mentioned above is represented by a radiographic image reading apparatus irradiating excitation light deflected by a polygon mirror on an accelerating phosphor panel storing therein radiographic image information, then, detecting accelerated emission light emitted from the accelerating phosphor panel and thereby reading a radiographic image at a pixel size selected from a plurality of reading sizes capable of being read, wherein there are provided a polygonal irregularity correction data storing means which stores plural polygonal irregularity correction data corresponding to plural pixel sizes capable of being read mentioned above, a polygonal irregularity correction data deciding means which selects, from the polygonal irregularity correction data storing means, polygonal irregularity correction data corresponding to a pixel size to be read, and a polygonal irregularity correcting means which corrects image data read by correction data selected by the polygonal irregularity correction data decision means.

The constitution of the invention wherein each sampling pitch has correction data for polygonal irregularity and clinical data are corrected by correction data corresponding to the sampling pitch makes it possible to correct accurately the polygonal irregularity caused by a polygon mirror.

A fourth embodiment of the present invention for solving the problems mentioned above is represented by a radiographic image reading apparatus irradiating excitation light deflected by a polygon mirror on an accelerating phosphor panel storing therein radiographic image information, then, detecting accelerated emission light emitted from the accelerating phosphor panel and thereby reading a radiographic image at a pixel size selected from a plurality of reading sizes capable of being read, wherein there are provided a polygonal irregularity correction data storing means which stores polygonal irregularity correction data corresponding to any pixel size, a polygonal irregularity correction data calculating means which calculates polygonal irregularity correction data so that they correspond to a reading pixel size of the image read from polygonal irregularity correction data of any pixel size stored in the polygonal irregularity correction data storing means, and a polygonal irregularity correcting means which corrects the read image data by the use of the polygonal irregularity correction data calculated with the polygonal irregularity correction data calculating means.

In the constitution of the invention, based on information of a reading pixel size, the correction data for correcting sensitivity irregularity caused by polygon corresponding to that pixel size can be obtained through calculation. Therefore, it is possible to obtain the correction data accurately.

DETAILED DESCRIPTION OF THE INVENTION

Example Structure of the Invention

Examples of the invention will be explained in detail as follows, referring to the drawings.

Figure 1:
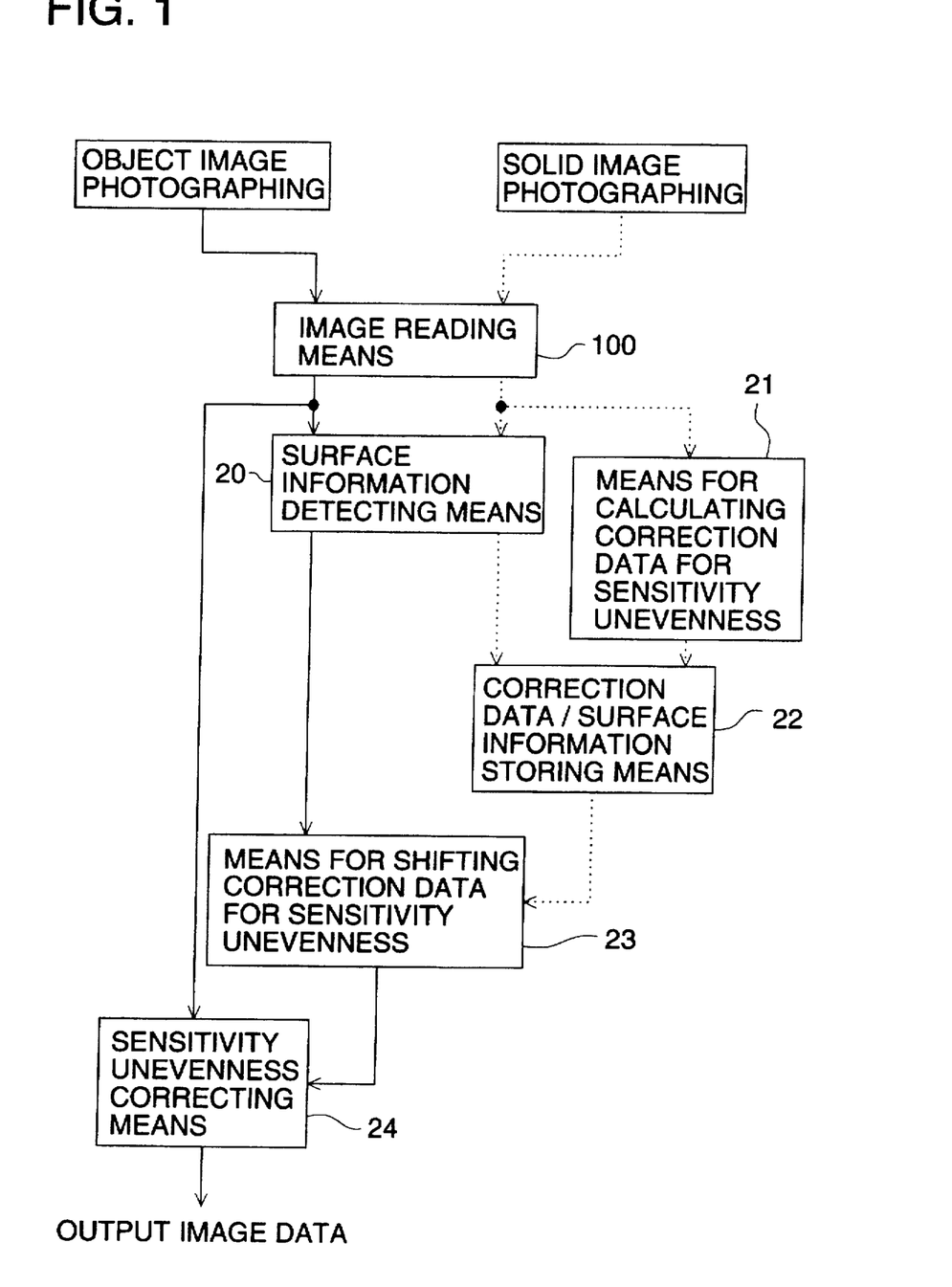
FIG. 1 is a block diagram showing the structure of a first example of the first embodiment.

FIG. 1 is a block diagram showing an example of the first embodiment. An apparatus shown in the drawing is a radiographic image information reading apparatus which reads images recorded on a radiographic image conversion panel and conducts a prescribed image processing, in which a polygon mirror is used in the beam scanning system. In the drawing, dotted lines indicate a flow of signals in photographing solid images, while, solid lines indicate a flow of signals in photographing an object image. In the drawing, 100 represents an image reading means wherein excitation light is irradiated on a radiographic image conversion panel and accelerated emission light emitted from the radiographic image conversion panel is read photoelectrically for obtaining image information, and details thereof are shown in FIG. 10. FIG. 10 shows an apparatus wherein polygon mirror 109 deflects a laser beam to scan radiographic image conversion panel 111, and accelerated emission light is detected for obtaining image data.

The numeral 20 is a face information detecting means wherein information on a radiographic image conversion panel is read by the image reading means 100 and face information on a polygon mirror is detected based on the read image, and the numeral 21 is a sensitivity irregularity correction data calculating means which obtains correction data of sensitivity irregularity for the almost entire surface of the image from image information (solid image information) under the state with no object read from the image reading means 100. The sensitivity irregularity in this case includes those caused by a polygon mirror and those caused by other items such as a phosphor and a reading system. The numeral 22 is a correction data/surface information storing means which receives output from the surface information detecting means 20 and the correction data calculating means 21 and stores correction data and surface information as a pair.

The numeral 23 is a sensitivity irregularity correction data shifting means which shifts the sensitivity irregularity correction data obtained by aforesaid sensitivity irregularity correction data calculating means 21 in the primary scanning direction and/or the sub-scanning direction, based upon output of the surface information detecting means 20 obtained when an object image to be corrected is read. The numeral 24 is a sensitivity irregularity correcting means which corrects object image data obtained by reading with the image reading means 100 based on the correction data obtained by the sensitivity irregularity correction data shifting means 23, and thereby obtains output image data. The sensitivity irregularity correction data shifting means 23 is one for making irregularity caused by a polygon mirror in sensitivity irregularity correction data to correspond to the same irregularity in the object image data. Operations of an apparatus constituted in the above manner will be explained as follows.

The image reading means 100 irradiates radiations on the entire surface of a radiographic image conversion panel under the condition of no object, then reads image information at that moment, and supplies them to sensitivity irregularity correction data calculating means 21. The sensitivity irregularity correction data calculating means 21 calculates sensitivity irregularity correction data for the most part of the entire surface of the image. The most part of the entire surface, in this case, means an area including an area where the object image exists. On the other hand, face information detecting means 20 detects face information of a polygon mirror from image data obtained by the image reading means 100 through its reading operation. These correction data detected by the sensitivity irregularity correction data calculating means 21 and face information which represents output of the face information detecting means 20 are stored in face information storing means 22 in the form of a pair. Preparation of the sensitivity irregularity correction data is made in a method shown in FIG. 11, for example, and sensitivity irregularity correction data J (x) in the primary scanning direction and sensitivity irregularity correction data F (y) in the sub-scanning direction are obtained. The sensitivity irregularity correction data calculated by the sensitivity irregularity correction data calculating means 21 are stored in correction data/face information storing means 22 to be paired with the face information detected by the face information detecting means 20.

Now, the face information detecting means 20 will be explained as follows. The face information detecting means 20 analyzes image data obtained by image reading means 100 through its reading operation and thereby obtains polygon face information. An analyzing method under the assumption that a polygon has 8 faces will be explained as follows. Concerning solid image data obtained through reading without an object, there are obtained 8 sum total values of signals each representing the value for the signal of every eighth line, in the manner of Expression (1), and the values of M1–M8 are obtained by standardizing them through Expression (2).

$$m_1 = \sum_{n=0}^{255} \sum_{x=1}^{2048} S(x, y_8 \cdot n + 1) \quad (1)$$

$$m_2 = \sum_{n=0}^{255} \sum_{x=1}^{2048} S(x, y_8 \cdot n + 2)$$

$$\vdots$$

$$m_8 = \sum_{n=0}^{255} \sum_{x=1}^{2048} S(x, y_8 \cdot n + 8)$$

$$M_1 = m_1 / \sum_{i=1}^{8} m_i \quad (2)$$

$$M_2 = m_2 / \sum_{i=1}^{8} m_i$$

$$\vdots$$

$$M_8 = m_8 / \sum_{i=1}^{8} m_i$$

Each of values of M1–M8 represents an amount showing characteristics of each face of a polygon. Namely, each of the values shows a change in signal values caused by a difference of reflectivity of each face and by an influence of an inclination angle of each surface of the polygon mirror. Therefore, when storing sensitivity irregularity correction data, values of M1–M8 are also stored.

Figure 2:
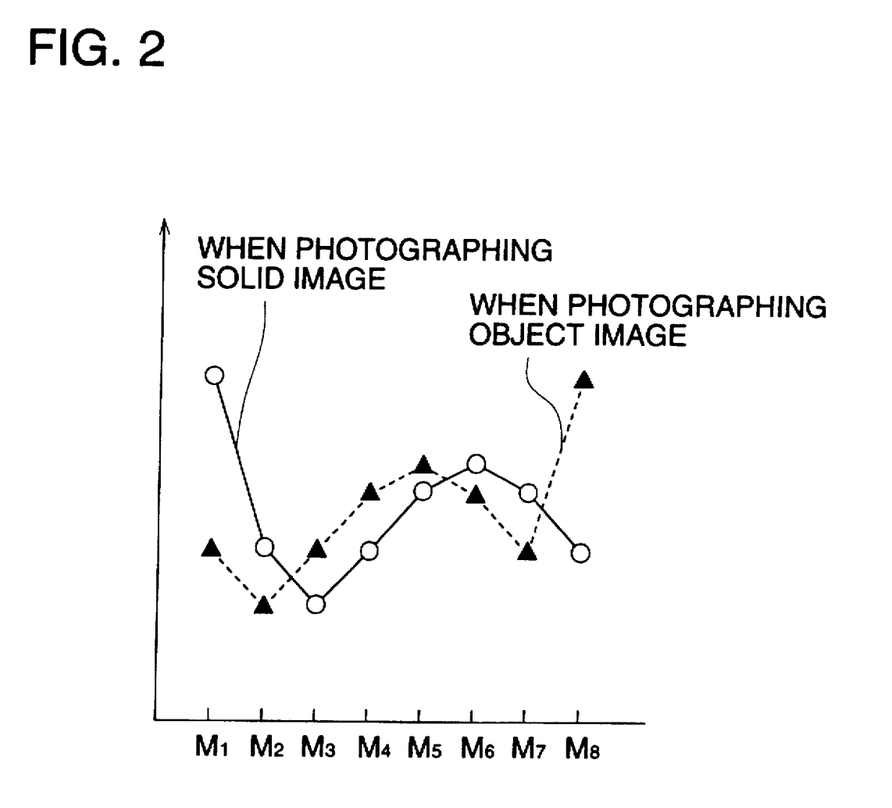
FIG. 2 is a diagram of characteristics comparison between solid images and object images.

Next, operations for photographing an object image will be explained as follows. An object image is read by image reading means 100, and image data are obtained. Then, face information detecting means 20 analyzes object image data to obtain M1–M8, and sends them to sensitivity irregularity correction data shifting means 23. In the sensitivity irregularity correction data shifting means 23, M1–M8 obtained through photographing solid image and stored therein in advance are compared with M1–M8 sent thereto newly. An example of the comparison is shown in FIG. 2. The comparison in FIG. 2 indicates that the start of reading on the surface of a polygon mirror in the case of photographing an object image is behind that of solid image photographing by one surface.

Based on this result, the sensitivity irregularity correction data shifting means 23 shifts the sensitivity irregularity correction data by one pixel in the sub-scanning direction. Namely, new correction data F' (y) satisfying F' (y)=F (y+1) are prepared from the sensitivity irregularity correction data F (y) in the sub-scanning direction, and its correction data F' (y) are sent to sensitivity irregularity correcting means 24. The sensitivity irregularity correcting means 24 corrects the object image data by using the correction data sent from the sensitivity irregularity correction data shifting means 23.

Incidentally, shifting the sensitivity irregularity correction data means that the correction data are subjected to parallel displacement for 0—several pixels so that they may act on the image to be corrected, as stated above. However, when sensitivity irregularity correction data are shifted as stated above, there is a possibility that irregularity other than that caused by a polygon can not be corrected properly although the irregularity caused by a polygon can be corrected accurately. However, especially in the case of sub-scanning, it is possible to correct properly even when the correction data are deviated by several pixels, because main reasons for the irregularity are a heel effect of an X-ray tube and a reduction of latent images of accelerating phosphors within a reading time period.

In the structure of the present example, surface information detecting means 20 which detects face information of a polygon mirror is provided, and when clinical image data are corrected, the sensitivity irregularity correction data shifting means 23 extracts correction data which corresponds to the detection face stored in correction data/face information storing means 22, by the use of output from the face information detecting means 20, and this correction data are used for correcting the clinical image data. It is therefore possible to correct accurately polygonal irregularity caused by a polygon mirror.

Figure 3:
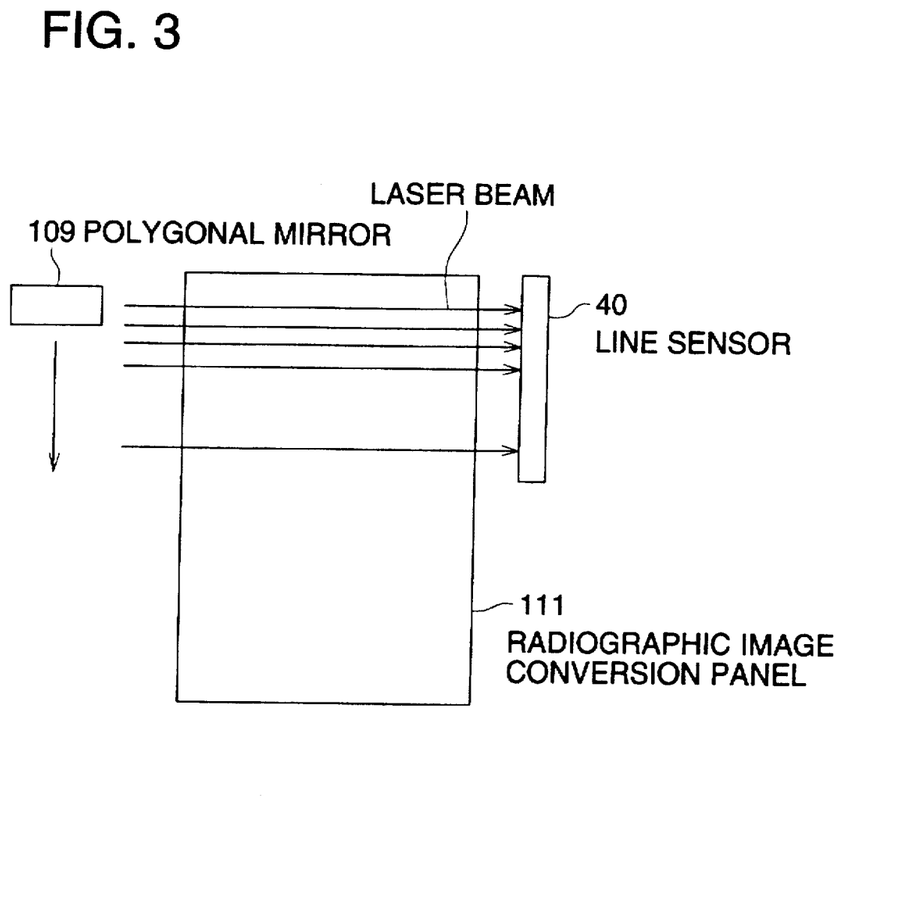
FIG. 3 is another illustration of detection of polygon mirror faces.
Figure 4:
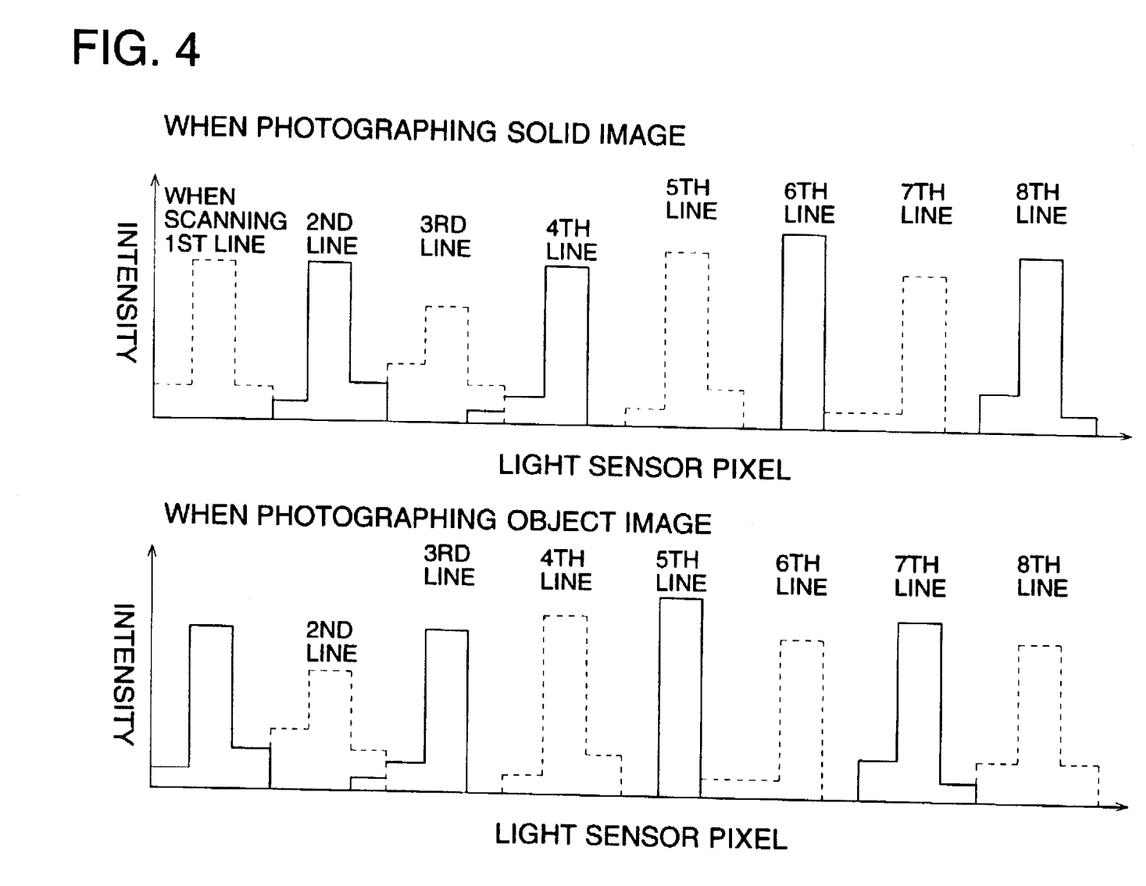
FIG. 4 is a diagram showing an example of output distribution characteristics of a line sensor.

Incidentally, with regard to the face information detecting means 20, there is also available, for example, a method for obtaining face information by the use of a light detecting element as follows, in addition to the method for analyzing image data obtained through reading. As shown in FIG. 3, in the vicinity of image reading means 100, there is arranged light-detecting line sensor 40 for detecting intensity and position of a laser beam for scanning. Each time the laser scanning in the primary scanning direction is conducted once, the line sensor can read, and laser scanning position and intensity distribution at that moment of each scanning can be obtained. An example of this method is shown in FIG. 4. When a position and intensity distribution for each scanning are measured, and thereby a comparison is made between solid image photographing and object image photographing, face information can be obtained.

In the structure of the example mentioned above, an example wherein polygonal irregularity in the sub-scanning direction is corrected was explained. However, the invention is not limited to this, and it is naturally possible to correct polygonal irregularity in the primary scanning direction in the same manner.

Figure 5:
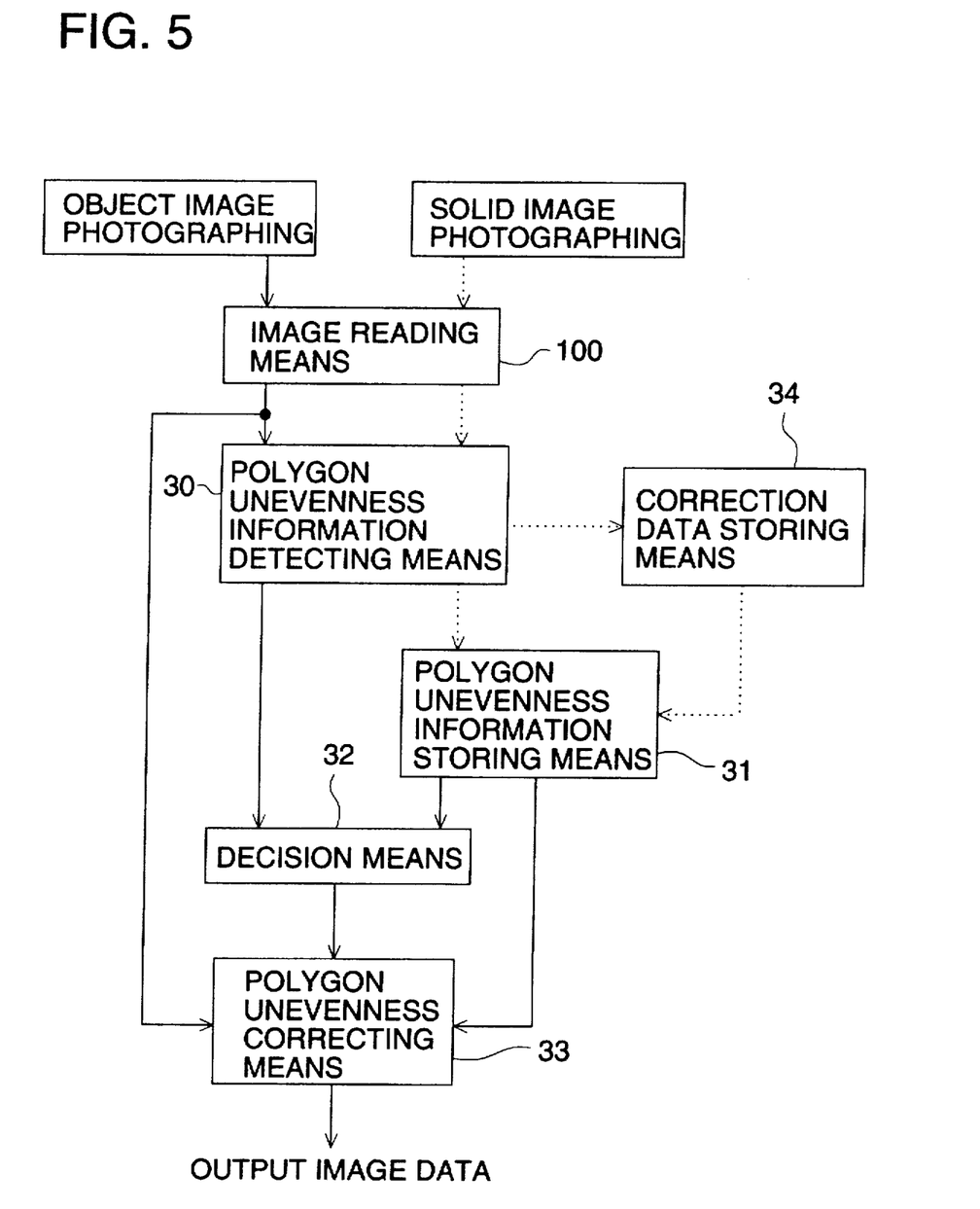
FIG. 5 is a block diagram showing the structure of a first example of the second embodiment.

FIG. 5 is a block diagram showing the structure of a first example of the second embodiment. Items in FIG. 5 which are the same as those in FIG. 1 are given the same symbols. An apparatus shown in the drawing is a radiographic image information reading apparatus which reads images recorded on a radiographic image conversion panel and conducts a prescribed image processing, in which a polygon mirror is used in a beam scanning system. In the drawing, dotted lines indicate a flow of signals in the case of solid image photographing, and solid lines show a flow of signals in the case of object image photographing.

In the drawing, the numeral 100 is an image reading means which irradiates excitation light on a radiographic image conversion panel, then reads accelerated emission emitted from the radiographic image conversion panel photoelectrically, and obtains image information, details of which are shown in FIG. 10. In FIG. 10, there is shown an apparatus wherein a laser beam is deflected by polygon mirror 109, then scans radiographic image conversion panel 111 and detects accelerated emission to obtain image data.

The numeral 30 is a polygonal irregularity information extracting means which receives output of the image reading means 100 and obtains information relating to sensitivity irregularity caused by a polygon, the numeral 34 is a correction data storing means which prepares polygonal irregularity correction data based on the polygonal irregularity information obtained by the aforesaid polygonal irregularity information extracting means 30 and stores them, and 31 is a polygonal irregularity information storing means which stores polygonal irregularity information which is obtained by the aforesaid polygonal irregularity information extracting means 30 and represents a standard.

The numeral 32 is a decision means which decides, when images are read by the image reading means 100, whether or not to correct the polygonal irregularity, based on polygonal irregularity information obtained by the aforesaid polygonal irregularity information extracting means 30 and on the standard polygonal irregularity information stored in aforesaid polygonal irregularity information storing means 31, and the numeral 33 is a polygonal irregularity correcting means which corrects, when the correction is necessary, polygonal irregularity based on the results of decision made by the decision means 32.

The image reading means 100 reads information on a radiographic image conversion panel under the state of no object, and sends them to polygonal irregularity information extracting means 30. The polygonal irregularity information extracting means 30 extracts the polygonal irregularity information from the solid image information sent from the image reading means 100. The polygonal irregularity information storing means 31 stores output from the polygonal irregularity information extracting means 30 at that moment as polygonal irregularity information to be a standard. On the other hand, the correction data storing means 34 prepares correction data based on the polygonal irregularity information extracted from the polygonal irregularity information extracting means 30, and stores them.

Next, the sequence enters the reading of object image data. The image reading means 100 irradiates a laser beam on a radiographic image conversion panel, then, converges accelerated emission caused by a laser beam and converts it to an electric signal to obtain object image data. On the other hand, the polygonal irregularity information extracting means 30 extracts polygonal irregularity information from object image data obtained by the image reading means 100 through its reading operation through a prescribed algorithm. The polygonal irregularity information extracting means 30 sends the polygonal irregularity information thus extracted to the decision means 32.

The decision means 32 compares the standard polygonal irregularity information stored in the polygonal irregularity information storing means 31 with the polygonal irregularity information extracted by the polygonal irregularity information extracting means 30, and checks whether the polygonal irregularity is the same as that in the case of preparation of correction data through a prescribed algorithm (details will be stated later). Then, it notifies the polygonal irregularity correcting means 33 whether or not to conduct correction. When the irregularity is different from the standard one, the correction by means of the correction data rather increases streak-shaped noises. Therefore, when the irregularity is different from the standard one, the polygonal irregularity correcting means 33 outputs clinical image data from the image reading means 100 as they are, as output image data. When the irregularity is the same as the standard one, the polygonal irregularity correcting means 33 corrects the object image data from the image reading means 100 with correction data read out from the correction data storing means 34, and outputs them as output image data.

According to this example, the aforesaid decision means 32 decides, based on output of the polygonal irregularity information extracting means 30, whether the polygonal irregularity in the case of object image photographing is the same as that in the case of preparation of correction data or not, and when they are different, no correction is made by the polygonal irregularity correcting means 33, and only when they are the same, correction is made by the polygonal irregularity correcting means 33. As a result, therefore, the polygonal irregularity caused by a polygon mirror can be corrected accurately.

Next, an algorithm for deciding whether the correction is required or not will be explained in detail as follows. In this case, there will be explained a method for analyzing image data obtained by image reading means 100 through its reading operation.

(1) Preparation of Standard Data

Figure 6:
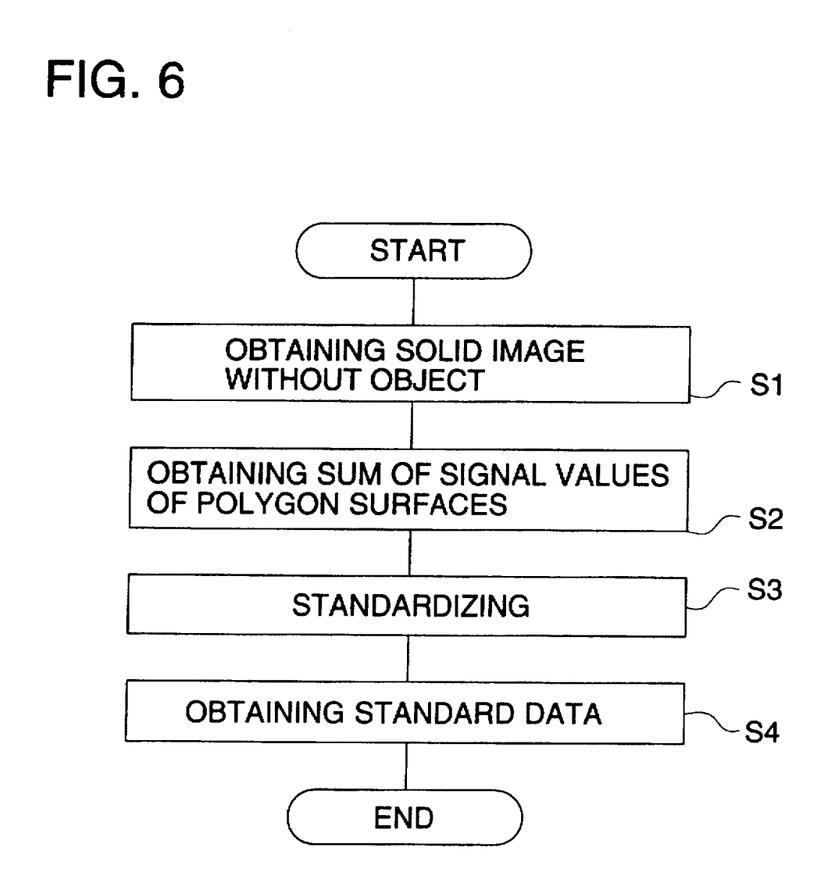
FIG. 6 is a flow chart showing operations for preparing standard data.

FIG. 6 is a flow chart showing operations for preparing the standard data. When preparing the standard data, a solid image without object is obtained by image reading means 100, and in the same manner as that explained in the structure example 1, values M1–M8 showing characteristics of each face of a polygon are obtained by Expressions (1) and (2). The M1–M8 thus obtained are used as standard data.

(2) Extracting Comparative Data From Object Image

Next, clinical image data with object are analyzed in the same manner as in the foregoing to obtain M1–M8.

(3) Decision

Decision means 32 judges from standard data M1–Mk sent from the polygonal irregularity information extracting means 30 and from comparative data H1–Hk and decides whether correction is required or not. The decision means 32 calculates a shifted amount T between Mi and Hi through the following expression based on Mi and Hi.

$$T = \sum_{i=1}^{8} (M_i - H_i)^2 \quad (3)$$

By comparing this value T with threshold value Q established in advance, a decision to correct or not to correct is made. Namely, when the value T is greater than the threshold value Q, no correction is conducted, while when the value T is smaller than the threshold value Q, namely when both image information are similar each other, correction is conducted. The threshold value Q is established directly, taking into consideration the extent of similarity between both image information which makes the correction effective.

Figure 7:
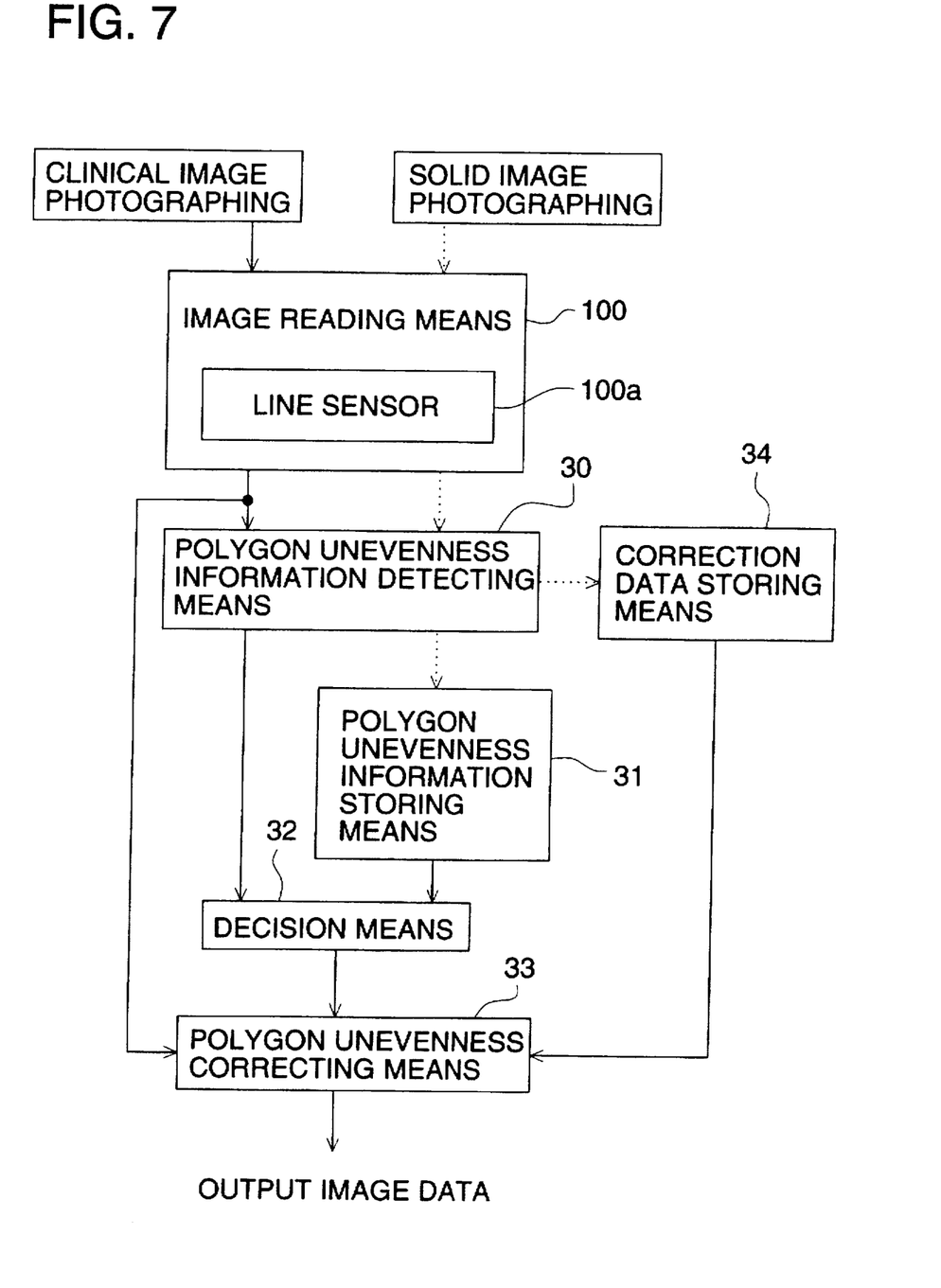
FIG. 7 is a block diagram showing the structure of a second example of the second embodiment.

FIG. 7 is a block diagram showing the structure of a second example of the second embodiment. Items in FIG. 7 which are the same as those in FIG. 5 are given the same symbols. In this example, light-detecting line sensor 100a is provided in image reading means 100 so that polygonal irregularity information extracting means 30 may extract polygonal irregularity information by means of output of this line sensor 100a. Structures other than the foregoing are the same as those in FIG. 5. Operations of an apparatus structured as described above will be explained as follows.

The line sensor 100a conducts reading for each laser scanning in the primary scanning direction, thus, laser position and intensity distribution are obtained. Polygonal irregularity information extracting means 30 receives output from the line sensor 100a and analyzes beam intensity and deviation of scanning position. Results of these analyses are stored in polygonal irregularity information storing means 31 as standard polygonal irregularity information, from the polygonal irregularity information extracting means 30. On the other hand, correction data storing means 34 prepares correction data based on the polygonal irregularity information outputted from the polygonal irregularity information extracting means 30, and stores them.

When photographing an object image, the line sensor 100a receives a beam coming from each polygon face and sends a signal to polygonal irregularity information extracting means 30. The polygonal irregularity information extracting means 30 receives output of the line sensor 100a and analyzes beam intensity and deviation in scanning position. Results of these analyses are sent to decision means 32. The decision means 32 compares the polygonal irregularity information which it received with the standard polygonal irregularity information stored in polygonal irregularity information storing means 31 in advance, and decides whether to correct or not to correct.

Figure 8:
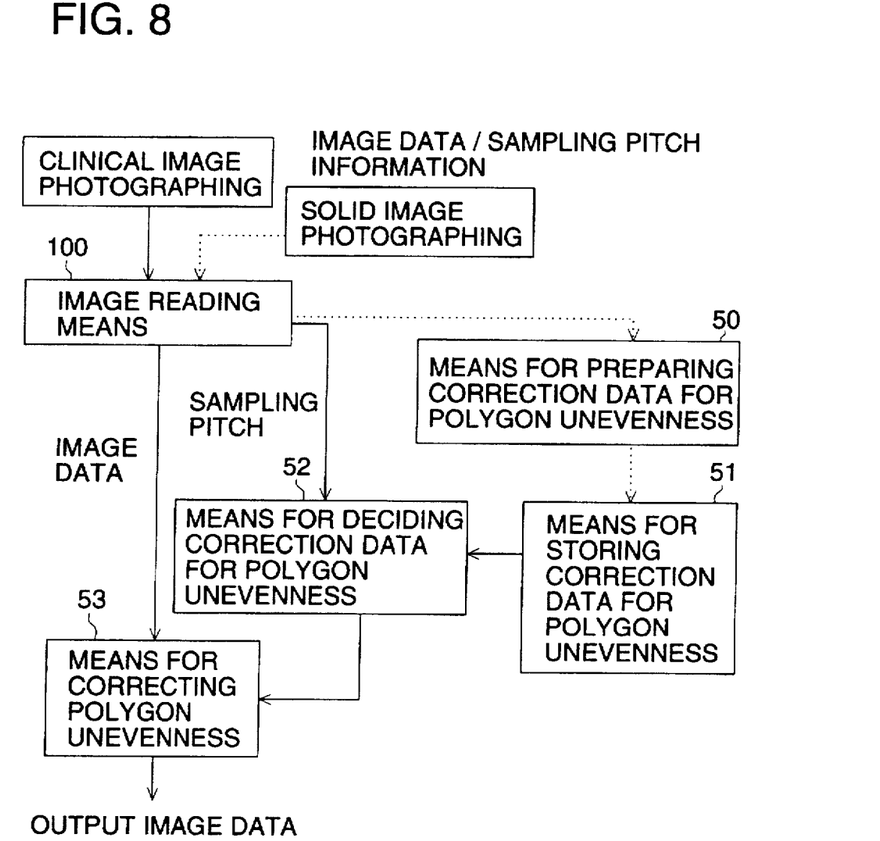
FIG. 8 is a block diagram showing the structure of an example of the third embodiment.

FIG. 8 is a block diagram showing the structure of a first example of the third embodiment. Items in FIG. 8 which are the same as those in FIG. 1 are given the same symbols. An apparatus shown in the drawing is a radiographic image information reading apparatus which reads images recorded on a radiographic image conversion panel and conducts a prescribed image processing, in which a polygon mirror is used in a beam scanning system.

In the drawing, the numeral 100 is an image reading means which irradiates excitation light on a radiographic image conversion panel, then reads accelerated emission emitted from the radiographic image conversion panel photoelectrically, and obtains image information, 50 is a polygonal irregularity correction data preparing means which prepares correction data for correcting polygonal irregularity from solid image data, 51 is a polygonal irregularity correction data storing means which stores the polygonal irregularity correction data prepared by the polygonal irregularity correction data preparing means 50 in a form of a pair with sampling pitch information, 52 is a polygonal irregularity correction data deciding means which decides correction data corresponding to sampling pitch based on sampling pitch information in the case of clinical image photographing, and 53 is a polygonal irregularity correcting means which corrects clinical image data based on correction data obtained by the polygonal irregularity correction data deciding means 52. Operations of an apparatus structured as described above will be explained as follows.

First of all, solid images with various sampling pitches are read by the image reading means 100, and correction data for correcting polygonal irregularity from the image data are prepared by the polygonal irregularity correction data preparing means 50. Then, these correction data are stored in the polygonal irregularity correction data storing means 51 so that they may correspond to the sampling pitch used for photographing them.

Next, object images are photographed and image data are read by the image reading means 100. Then, reading sampling pitch information corresponding to that moment is outputted to the polygonal irregularity correction data deciding means 52. Then, the polygonal irregularity correction data deciding means 52 which has received the sampling pitch information reads from the polygonal irregularity correction data storing means 51 the correction data corresponding to that sampling pitch information and outputs them to the polygonal irregularity correcting means 53. Then, the polygonal irregularity correcting means 53 which has received the correction data corrects clinical image data based on that correction data, and then outputs image data.

An example, wherein the correction data corresponding in quantity to the number of kinds of sampling pitches has been explained. However, the invention is not limited to this. For example, it is also possible to have correction data for some typical sampling pitches, and to obtain others through interpolation. Or, it is also possible to have sampling pitch dependency of correction data by making it to be the function and to calculate the correction irregularity data.

In this example, moreover, image data are corrected by the correction data corresponding to the sampling pitch. Therefore, polygonal irregularity caused by a polygon mirror can be corrected accurately.

Effect of the Invention

As stated in detail above, polygonal irregularity caused by a polygon mirror can be corrected accurately in the first embodiment wherein a face information detecting means detecting face information of a polygon mirror is provided and correction data are modified by a sensitivity irregularity correction data shifting means for correction when correcting object image data.

In this case, the aforesaid face information detecting means can detect polygon mirror face information by analyzing clinical image data obtained by aforesaid image reading means through its reading operation, and thereby the clinical image data can be corrected by the use of correction data corresponding to the polygon mirror faces, thus, polygonal irregularity caused by a polygon mirror can be corrected accurately.

Further, the aforesaid face information detecting means can detect polygon mirror face information by analyzing output of one-dimensional or two-dimensional sensor, and thereby the clinical image data can be prepared by the use of correction data corresponding to the polygon mirror and faces, thus, polygonal irregularity caused by a polygon mirror can be corrected accurately.

In the second embodiment, when the aforesaid image reading means reads images, a decision of whether to correct polygonal irregularity or not is made based on polygonal irregularity information obtained by the aforesaid polygonal irregularity information extracting means and on the standard polygonal irregularity information stored in the aforesaid polygonal irregularity information storing means, and the aforesaid polygonal irregularity correcting means corrects only when the polygonal irregularity is the same as that in the case of preparation of correction data. As a result, therefore, polygonal irregularity caused by a polygon mirror can be corrected accurately.

In this case, the aforesaid polygonal irregularity information extracting means can extract polygonal irregularity information by calculating image data. Therefore, no special mechanism for extracting polygonal irregularity information is required.

Further, the polygonal irregularity information extracting means can extract polygonal irregularity information by analyzing output of a sensor composed of a one-dimensional or two-dimensional light sensor. Therefore, polygonal irregularity information can be extracted by a simple constitution.

Polygonal irregularity caused by a polygon mirror can be corrected accurately in the third embodiment wherein each sampling pitch has its correction data for polygonal irregularity and clinical image data are corrected by the correction data corresponding to the sampling pitch.

Correction data can be obtained accurately in the fourth embodiment wherein correction data for correcting, based on information of a pixel size for reading, the sensitivity irregularity caused by a polygon corresponding to that pixel size is obtained through calculation.

What is claimed is:

1. An apparatus for reading a radiographic image on a stimulable phosphor sheet, said apparatus comprising:
    scanning means, including a rotatable polygon mirror having N pieces of mirror surfaces, for scanning the stimulable phosphor sheet line by line with exciting light in accordance with a rotation of the polygon mirror so that the stimulable phosphor sheet emits light corresponding to the radiographic image, wherein the scanning means scans one line with one mirror surface and scans a next line with a next mirror surface so that the scanning means scans N lines during one rotation of the polygon mirror;
    reading means for photoelectrically reading the emitted light so that image signals are obtained line by line; and
    correcting means for correcting the image signals so as to eliminate irregularity caused by the polygon mirror, said correcting means including:
        (i) a memory for storing a correction value for each of the mirror surfaces,
        (ii) surface detecting means for identifying a mirror surface used for scanning a current line of the image signals, and
        (iii) shifting means for shifting data in the memory to the correction value of the identified mirror surface;
    wherein the correcting means corrects the image signals of the current line with the correction value of the identified mirror surface and corrects the image signals of the next line with the correction value of the mirror surface next to the identified mirror surface, and
    wherein the surface detecting means identifies the mirror surface by comparing a pattern of reference image signals over N lines and a pattern of object image signals over N lines.

2. The apparatus of claim 1, wherein the correction value of the mirror surfaces are prepared based on a solid image on a stimulable phosphor sheet whose entire surface is irradiated without placing an object before the sheet.

3. The apparatus of claim 2, wherein the correction value of the mirror surfaces are prepared based on image signals photoelectrically obtained from the solid image.

4. The apparatus of claim 2, wherein the correction value of the mirror surfaces are prepared based on data obtained from the solid image by an optical sensor.

5. An apparatus for reading a radiographic image on a stimulable phosphor sheet, said apparatus comprising:
    scanning means, including a rotatable polygon mirror having a plurality of mirror surfaces, for scanning the stimulable phosphor sheet line by line with exciting light in accordance with a rotation of the polygon mirror so that the stimulable phosphor sheet emits light corresponding to the radiographic image;
    reading means for photoelectrically reading the emitted light so that image signals are obtained line by line; and
    correcting means for correcting the image signals so as to eliminate irregularity caused by the polygon mirror, said correcting means including:
        (i) a memory for storing reference data of the irregularity caused by the polygon mirror,
        (ii) extracting means for obtaining data of irregularity caused by the polygon mirror from the image signals, and
        (iii) judging means for comparing the obtained data with the reference data and for determining whether to carry out correction based on a comparison result.

6. An apparatus for reading a radiographic image on a stimulable phosphor sheet, said apparatus comprising:
    scanning means, including a rotatable polygon mirror having a plurality of mirror surfaces, for scanning the stimulable phosphor sheet line by line with exciting light in accordance with a rotation of the polygon mirror so that the stimulable phosphor sheet emits light corresponding to the radiographic image, said scanning means changing a sampling pitch so that a pixel size is changed in accordance therewith;
    reading means for photoelectrically reading the emitted light so that image signals are obtained line by line; and
    correcting means for correcting the image signals so as to eliminate irregularity caused by the polygon mirror, said correcting means including:
        (i) a memory for storing a correction value for the irregularity caused by the polygon mirror, and
        (ii) changing means for changing the correction value in accordance with a current pixel size.

7. The apparatus of claim 6, wherein the memory stores plural sets of correction values for possible pixel sizes, and the changing means selects the corresponding correction value for the current pixel size.

8. The apparatus of claim 6 wherein the changing means calculates a correction value for the current pixel size based on the stored correction value.

9. An apparatus for reading a radiographic image on a stimulable phosphor sheet, said apparatus comprising:

(1) a scanning unit, including a rotatable polygon mirror having N pieces of mirror surfaces, for scanning the stimulable phosphor sheet line by line with exciting light in accordance with a rotation of the polygon mirror so that the stimulable phosphor sheet emits light corresponding to the radiographic image along the scanning line, wherein the scanning unit scans one line with one mirror surface and scans a next line with a next mirror surface so that the scanning unit sequentially scans N lines during one rotation of the polygon mirror;

(2) a reading unit for photoelectrically reading the light emitted along the scanning line so as to produce image signals in a form of linear series pixels for each scanning line;

(3) a correction data calculating unit for receiving Y lines of reference image signals produced in such a manner that the scanning unit scans a reference image on the stimulable phosphor sheet with the polygon mirror, the correction data calculating unit producing Y lines of correction data based on the Y lines of reference image signals;

(4) a surface data detecting unit for producing N pieces of surface data indicating characteristics of each of the N pieces of mirror surfaces and for providing each of the Y lines of correction data with one of the N pieces of surface data;

(5) a memory for storing each of the Y lines of correction data in a correlated form with the provided surface data;

wherein said surface data detecting unit receives Y' lines of object image signals produced when the scanning unit scans an object image on the stimulable phosphor sheet with the polygon mirror, said surface data detecting unit providing each of the Y' lines of object image signals with one of the N pieces of surface data, and wherein said apparatus further comprises:

(6) a shifting unit for comparing the surface data of the Y' lines of object image signals with the surface data of the Y lines of correction data and for shifting the Y lines of correction data so as to conform the surface data of each of the Y' lines of object image signals with the surface data of each of the Y lines of correction data; and (7) a correcting unit for correcting a line of object image signals with a line of correction data having the same surface data as that of the line of object image signals.

10. The apparatus of claim 9, wherein the reference image comprises a solid image obtained by irradiating the stimulable phosphor sheet without placing an object before the sheet.

11. The apparatus of claim 9, wherein the surface data detecting unit produces the N pieces of surface data based on the Y' lines of reference image signals.

12. The apparatus of claim 9, wherein the surface data detecting unit comprises a sensor for detecting light from each of the N pieces of mirror surfaces of the polygon mirror, and produces the N pieces of surface data based on the detected light.

* * * * *